United States Patent [19]

Holden

[11] 3,928,721

[45] Dec. 23, 1975

[54] ELECTRICAL WAVE FILTER

[76] Inventor: Thomas W. Holden, 301 W. 16th Place, Chicago Heights, Ill. 60411

[22] Filed: Nov. 23, 1973

[21] Appl. No.: 418,377

[52] U.S. Cl. .................................. 178/88; 333/70 R

[51] Int. Cl.$^2$ .......................................... H04L 15/24

[58] Field of Search ...... 178/88; 325/368, 369, 372, 325/379, 489, 320; 329/126, 138, 142; 333/70 R, 70 A, 70 T, 76; 179/1 C, 1 D

[56] References Cited

UNITED STATES PATENTS

| | | | |
|---|---|---|---|
| 2,990,525 | 6/1961 | Grant | 333/74 |
| 3,325,753 | 6/1967 | Shearer et al. | 333/76 |

*Primary Examiner*—Robert L. Griffin
*Assistant Examiner*—Robert Hearn
*Attorney, Agent, or Firm*—Hill, Gross, Simpson, Van Santen, Steadman, Chiara & Simpson

[57] ABSTRACT

A selective wave filter employs a phase shift circuit and a pair of frequency selective circuits to provide a waveform that substantially represents the envelope of an input tone burst, such as a dot or dash used in radio telegraphy. The outputs of the frequency selective circuits are algebraically added after signal detection to provide a waveform which more accurately represents the envelope of the input signal. An output circuit employs apparatus in the form of a balanced modulator, relay, audio oscillator or the like. An output is also provided which only benefits from the action of an energy absorbing means connected between the pair of frequency selective circuits.

18 Claims, 8 Drawing Figures

ELECTRICAL WAVE FILTER

BACKGROUND OF THE INVENTION

1. Field of the Invention

This invention relates to frequency selective systems, and is more particularly concerned with electric wave filter apparatus with a minimum ring for a given amount of selectivity.

2. Description of the Prior Art

In the reception of radio telegraph signals and in other like applications, it is desirable to have a selective filter which provides for a cessation of the output signal almost as soon as the input signal is removed. Unless this happens in radio telegraph reception, the dots and dashes will blend into each other and be very difficult to copy.

It is common practice to design a filter to respond to a wide band of frequencies in order to prevent the filter from having an output signal after the input signal to the filter has been removed. This design technique, however, defeats the purpose of the filter.

SUMMARY OF THE INVENTION

The existence of an output signal from a filter, after the input signal has been removed, will hereinafter be termed "ring", and the present invention has as a primary object to provide less ring, for a given amount of selectivity. Stated another way, a primary object of the invention is to provide a selective filter that has much less decay time, for a given amount of selectivity, than conventional filters.

A similar object of the invention is to provide a selective wave filter that will provide an output signal with a short rise time and a short decay time, and also be very selective.

A selective wave filter includes a phase shift network for receiving an input signal at, for example 1000 Hz, and feeding a pair of selective resonant circuits tuned to resonate slightly above and below 1000 Hz, for example to 1015 Hz and 985 Hz, respectively. Both resonant circuits feed two rectifiers. One of the rectifiers is fed with a waveform having an envelope with a single peak for each tone burst, while the other rectifier is fed with a waveform having an envelope which has two peaks for each tone burst. The output of the two rectifiers are connected in opposition and the rectified signal is passed through a filter to substantially remove the audio component and provide the resultant envelope which closely resembles the generally rectangular shape of the input tone burst. The output of the filter is then employed to key a balanced modulator, relay, audio oscillator or the like to provide an output signal which may be read as an accurate representation of the input signal.

BRIEF DESCRIPTION OF THE DRAWINGS

Other objects, features and advantages of the invention, its organization, construction and operation will be best understood from the following detailed description of an exemplary embodiment of the invention taken in conjunction with the accompanying drawings, on which.

DESCRIPTION OF THE PREFERRED EMBODIMENT

Figure 1:
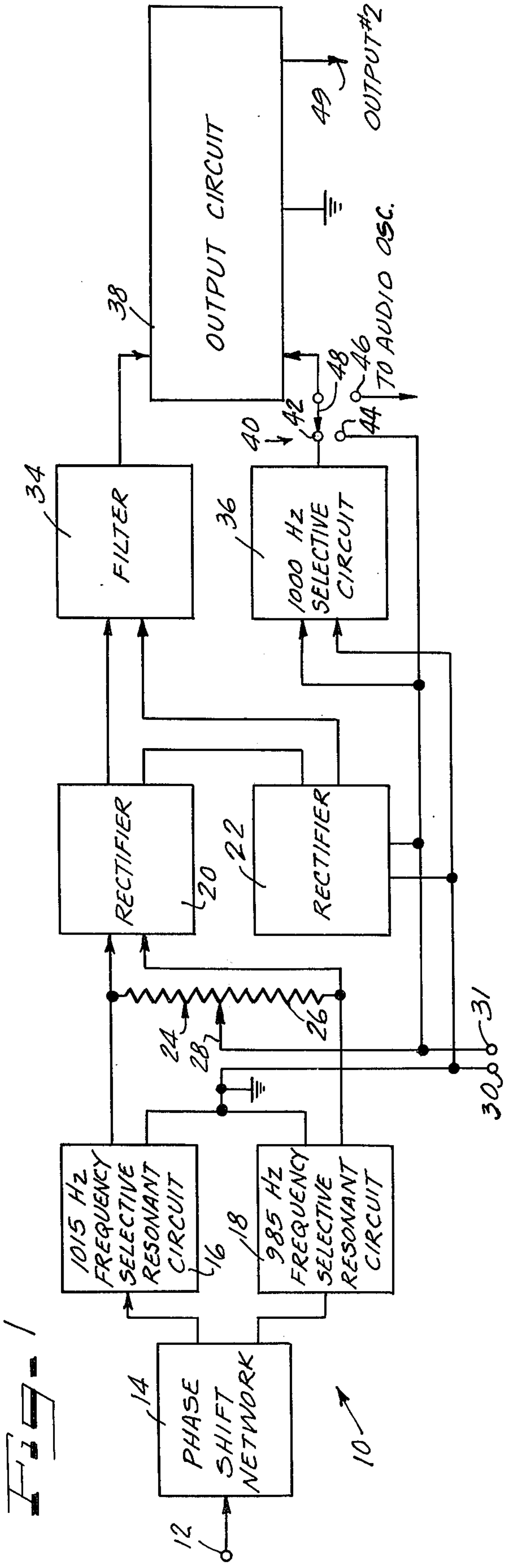
FIG. 1 is a schematic block diagram of a selective wave filter constructed in accordance with the principles of the present invention.

Referring to FIG. 1, a selective filter circuit is generally illustrated at 10 as comprising an input, between a terminal 12 and ground, connected to a phase shift network 14 which feeds a pair of frequency selective resonant circuits 16 and 18. The frequency selective resonant circuits 16 and 18 are also connected to a rectifier 22. The two resonant circuits 16 and 18 are connected to a rectifier 20 and to a variable resistor 24 (energy absorber, ring damper) having a resistor 26 and a movable tap 28. The two resonant circuits 16 and 18 are further connected together and to ground potential and with the movable tap 28 provide a pair of output terminals 30, 31.

Figure 2:
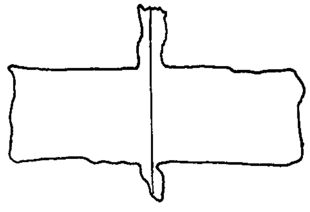
FIGS. 2–5 are waveforms found at various points in the apparatus of FIG. 1 and FIG. 7.
Figure 3:
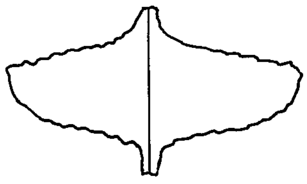
Figure 4:
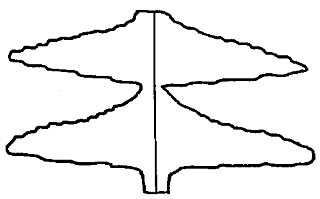

When, for example, a 1000 Hz tone burst, having an envelope as illustrated in FIG. 2, is received at the input 12, the rectifier 20 is provided with a signal having an envelope as illustrated in FIG. 4 and the rectifier 22 is provided with a signal having an envelope as illustrated in FIG. 3.

Figure 5:
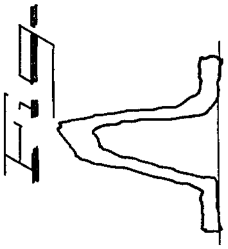
Figure 6:
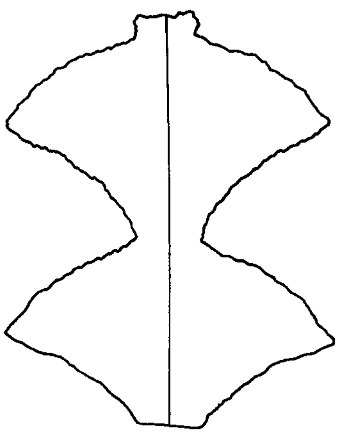
FIG. 6 is a representation of an output waveform from a conventional selective wave filter.

The rectifiers 20 and 22 feed a filter 34 which substantially removes the audio component from the signal and provides an output waveform, such as illustrated in FIG. 5, to an output circuit 38.

The output signal at the terminals 30, 31 may also be passed to a selective circuit, for example a 1000 Hz selective circuit 36 which feeds the output circuit 38 by way of a switch contact 42 and a movable contact 48 of a switch 40. The switch 40 may also be employed to provide an input to the output circuit 38 directly from the output terminal 31 by way of a switch contact 44, or from an audio oscillator by way of a switch contact 46.

The output circuit 38 may be a balanced modulator or the like, as mentioned above, and it may also be a relay or an audio oscillator. If an audio oscillator is employed, the signal from the selective circuit would not be needed inasmuch as the waveform of FIG. 5 may be employed to turn the oscillator on and off.

The apparatus disclosed above, up to the output terminals 30, 31, may be designed to operate at frequencies above the audio range. When this is done, the 1000 Hz signal to the output circuit 38 may be obtained by a heterodyne circuit connected to the output terminals 30, 31.

Referring to FIGS. 2–6 for a moment, FIG. 2 may be a tone burst produced by an audio oscillator and an automatic key. As an example, the waveform of FIG. 2 may be 25 milliseconds in duration and repeated every 50 milliseconds. The phase shift network is adjusted until the waveform of FIG. 4 appears at the input to the rectifier 20. With this adjustment of phase shift network 14, the frequency selective networks 16 and 18, at the time corresponding to the valley between the two peaks in the waveform of FIG. 4, are described as being in opposing relation with respect to the production of current flow in the energy absorbing means 26 of FIG. 1, for example. At this point, the waveform of FIG. 3 appears at the output terminals 30, 31. This signal may be copied; however, the apparatus to the right of these terminals will generally provide a better ring condition. The output signal of the present invention has a fast rise time and fast decay time with the selectivity down 6 dB at 40 Hz bandwidth, as compared with the waveform illustrated in FIG. 6 in which the signals overlap with a bandwidth of 50 Hz at 6 dB down.

Figure 7:
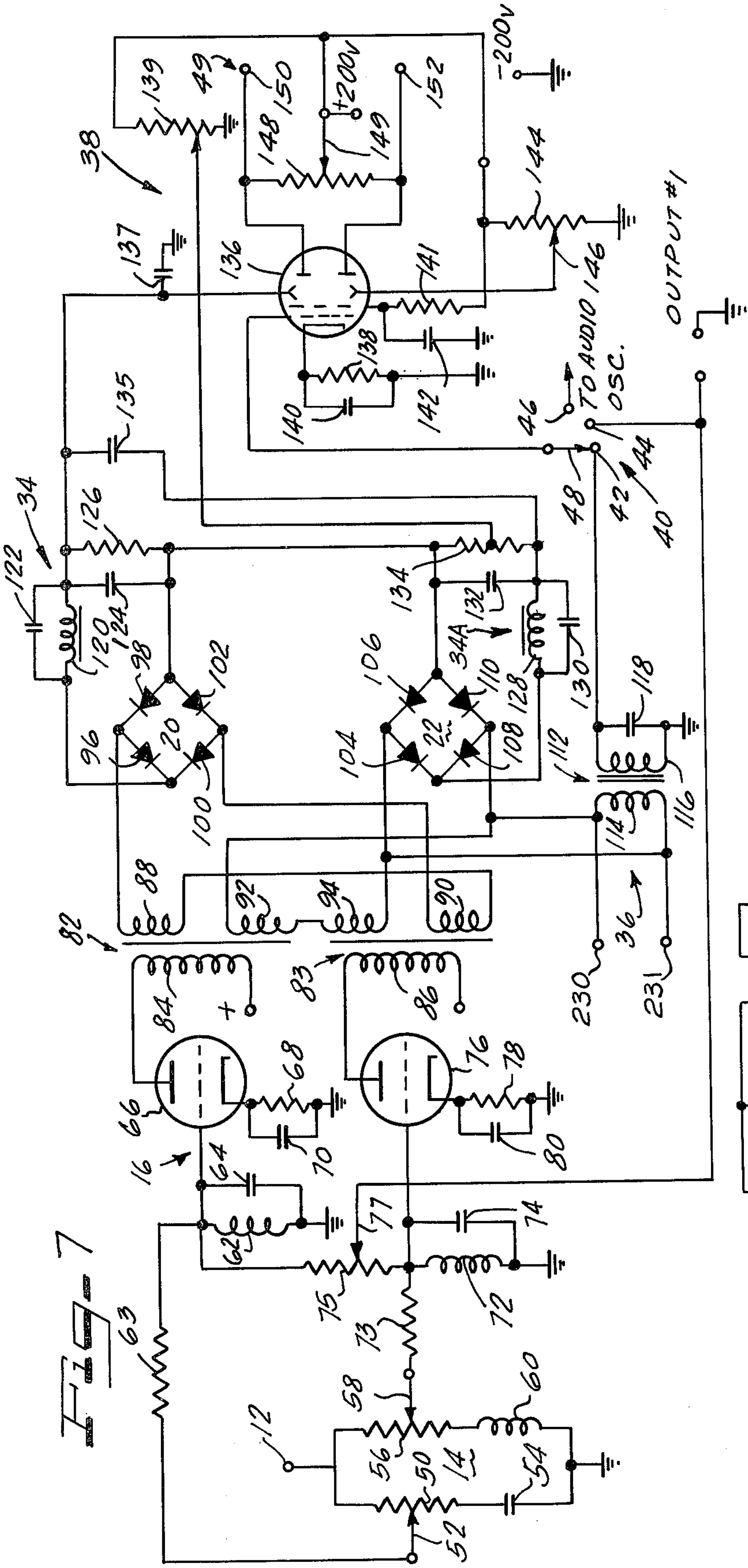
FIG. 7 is a schematic circuit diagram of a selective wave filter constructed in accordance with the principles of the present invention.

Referring to FIG. 7, a selective wave filter is illustrated in greater detail. An input terminal 12 is connected to a phase shifter 14 which comprises a variable resistor 50 having a movable tap 52 and connected in series with a capacitor 54 between the input terminal 12 and ground. The phase shifter further includes a second variable resistor 56 having a movable tap 58, the resistor 56 being connected in series with an inductor 60 between the input terminal 12 and ground.

The movable tap 52 is connected via a resistor 63 to a 1015 Hz resonant circuit 16 which comprises an inductor 62 and a capacitor 64 connected in parallel with the inductor 62. The inductor 62 and the capacitor 64 are connected to the grid of a triode 66 which has its cathode connected to ground by way of a resistor 68 which has a capacitor 70 connected thereacross. The movable tap 58 is connected via a resistor 73 to, for example, a 985 Hz resonant circuit which comprises an inductor 72 having a capacitor 74 connected thereacross. The inductor 72 and the capacitor 74 are connected to the grid of a triode 76 which has its cathode connected to ground by way of a resistor 78 having a capacitor 80 thereacross. A resistor 75 connects the resonant circuits together and absorbs energy from the resonant circuits during their rise times and decay times. An output is constituted by the movable tap 77 and ground.

The anode of the triode 66 is connected to a supply potential by way of a primary winding 84 of a transformer 82, while the anode of the triode 76 is connected to the supply potential by way of a primary winding 86 of a transformer 83.

The transformer 82 comprises a plurality of secondary windings including a winding 88 and a winding 92 which are respectively coupled to the primary winding 84. The transformer 83 comprises a plurality of secondary windings including a winding 90 and a winding 94. A pair of secondary windings 88 and 90 are connected in series across a bridge rectifier 20 which includes a plurality of diodes 96, 98, 100 and 102. A pair of secondary windings 92 and 94 are connected in series across a bridge rectifier 22 which includes a plurality of diodes 104, 106, 108, and 110. The secondary windings are also connected to provide a pair of output terminals 230, 231 and to feed a selective circuit, for example a 1000 Hz selective circuit 36, which includes a transformer 112 having a primary winding 114 connected across the serially connected secondary windings 92 and 94, and a secondary winding 116 having a capacitor 118 thereacross. The windings 114 and 116 are loosely coupled, just sufficiently to drive the grid of a tube 136.

The full wave rectifier 20 is connected to a low pass filter 34 which comprises a series arm including a parallel connected inductor 120 and capacitor 122 and a shunt arm comprising a capacitor 124 having a resistor 126 connected in shunt therewith. The full wave rectifier 22 is connected to a low pass filter 34A which includes a series arm having a parallel connected inductor 128 and a capacitor 130, and a shunt arm including a capacitor 132 and a resistor 134 connected thereacross. A capacitor 135 is connected from the resistor 134 to the resistor 126, and the tap on the resistor 134 is connected via the tap of a variable resistor 139 to a supply voltage The waveform at the output of the low pass filters 34, 34A is that illustrated in FIG. 5. This signal is applied to the output circuit 38, which is here illustrated as a balanced modulator. The output circuit 38 comprises a double plate sheet beam tube in the form of a duo pentode 136 having one deflection plate connected to the resistor 126 of the low pass filter 34 and the other deflection plate connected to an adjustable voltage divider which comprises a variable resistor 144 having a movable tap 146. A capacitor 137 stabilizes the deflection plate voltage. The cathode of the tube 136 is connected to ground by way of a resistor 138 having a capacitor 140 connected thereacross. A grid of the tube 136 is connected to the supply potential by way of a resistor 141 and is connected to ground by way of a bypass capacitor 142. The tube 136 includes a pair of anodes which are connected to a pair of output terminals 150, 152 which constitute the output 49 of the circuit. A variable resistor 148 having a movable tap 149 is connected across the anodes for balancing the modulator.

The output circuit 38 is provided with a plurality of inputs by way of a switch 40 which has a movable contact 48 which may engage a contact 46 which is connected to an audio oscillator, a contact 44 which is connected directly to the output No. 1 or a contact 42 which is connected to the 1000 Hz selective circuit 36.

To adjust the sliding tap of the resistor 139, the following steps should be taken;

1. Remove the input signal from the filter;
2. Place the movable contact 48 to the audio oscillator position and apply about ½ volt to the grid of the tube 136;
3. Adjust tap until output at 150, 152 is near zero;
4. Adjust movable tap 149 for an output voltage of zero at the terminals 150, 152.

When the waveform of FIG. 5 appears at the deflection plate of the tube 136, the signal from the selective circuit will be permitted to pass to the output. The result is an output 1000 Hz signal that has a fast rise and decay time like the waveform of FIG. 5. The selective circuit that feeds the grid of the tube 136 may be bypassed. However, its use improves the selectivity of the circuit. The grid connected to the movable contact 48 of the switch 40 may be fed with an audio oscillator. If the input frequency to the filter is changed 25 cycles, the waveforms of FIGS. 3 and 4 will appear nearly alike and after rectification and filtering, they will cancel and the waveform of FIG. 5 will not appear and the final output will be near zero.

The triodes 66 and 76 may be eliminated. When this is done, the pickup coils that feed the rectifiers are coupled to the two resonant circuits.

It should be noted that the full wave bridge rectifiers double the 1000 Hz input frequency. For this reason, the resonant circuit in the low pass filter is adjusted to resonate at 2000 Hz..

Figure 8:
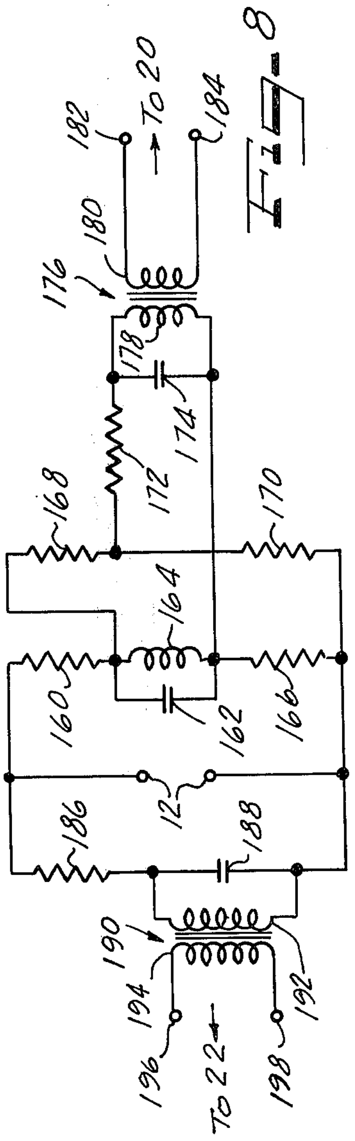
FIG. 8 is a schematic circuit diagram of a circuit which may be employed in practicing the present invention.

Referring now to FIG. 8, the circuit illustrated is one of many ways to develop waveforms that are similar to the waveforms of FIGS. 3 and 4. In this circuit only one resonant frequency is employed. All of the improvements in the rise and decay time is due to the action of the rectifiers and the low pass filters. The circuit includes an input 12 which is connected across a series connector of a resistor 160, an inductor 164 and a resistor 166, with a capacitor 162 connected in shunt relation to the inductor 164. From the junction between the resistor 160 and the inductor 164 a resistor 168 and a resistor 172 are connected in series with a primary winding 178 of a transformer 176, the winding 178 having its other terminal connected to the junction between the resistor 166 and the inductor 164. A resistor 170 is connected between the junction of the resistor 168 and the resistor 172 and the other terminal of the resistor 166. A capacitor 174 is connected across the primary winding 178 of the transformer 176. The transformer 176 includes a secondary winding 180 having a pair of output terminals 182, 184 which are to be connected across the full wave bridge rectifier 20 of FIG. 7.

The circuit further includes the series connection of a resistor 186 and a capacitor 188. The capacitor 188 is connected to a winding 192 of a transformer 190 connected therecross, the transformer 190 further including a secondary winding 194 having a pair of output terminals 196, 198 which are to be connected across the full wave bridge rectifier 22 of FIG. 7. The transformers 176 and 190 have loose coupling between their primary and secondary windings to prevent the rectifiers 20 and 22 from placing too great a load on the resonant circuits and destroying the selectivity. If loose coupling is not used, an amplifier must be connected ahead of each of the rectifiers 20, 22. From the foregoing description, it is clearly evident that the circuit of FIG. 8 may be employed in place of the apparatus between the input 12 and the rectifiers 20, 22 of FIG. 7.

The waveform of FIG. 4 is developed in this bridge circuit because the circuit is balanced under steady state conditions. The bridge is not balanced during the rise and decay time of the resonant circuits. The value of the resistor 168 is equal to the impedance of the resonant circuit at resonance. The value of the resistor 166 is equal to the value of the resistor 170 and the resistor 172 is employed to adjust the selectivity of the final resonant circuit.

It should be noted that similar satisfactory operation can also be achieved by feeding a frequency selective amplifier from the phase shift network and feeding a second frequency selective active amplifier from the phase shift network, the frequency selective active amplifiers having different resonant frequencies and having their outputs connected together by way of an energy absorbing impedance, such as a variable resistor. One circuit which may advantageously be employed for this purpose is circuit number 32 in the RCA Hobby Circuits Manual, Copyright 1970 by RCA Corporation. Selective filters using mechanical reeds may also be used as the frequency selective networks.

It will also be appreciated that an energy absorbing means may be employed, as noted above and illustrated in FIG. 1, between the frequency selective resonant circuits, or the frequency selective circuits may be constructed to load each other to perform this function. The energy absorbing means in FIG. 7 is the tapped resistor 75, the resistors 63 and 73 and the resistance of the phase shift network 14. Also, it should be noted that the low pass filters can be constituted by means of active low pass filter circuits and that crystal circuits can be employed as the frequency selective circuits. Crystal filter circuits may advantageously be employed for frequencies above the audio range.

Circuits constructed in accordance with FIGS. 7 and 8 operated quite well with the following component values.

| | COMPONENT | VALUE |
|---|---|---|
| Resistors: | | |
| | 138 | 300 ohms |
| | 68,78 | 900 ohms |
| | 56 | 2,950 ohms |
| | 126 | 6,000 ohms |
| | 50,168 | 32,000 ohms |
| | 166,170 | 42,000 ohms |
| | 160 | 50,000 ohms |
| | 75 | 65,000 ohms |
| | 63,73,139,144 | 100,000 ohms |
| | 148 | 140,000 ohms |
| | 172,186 | 160,000 ohms |
| | 134 | 6,000 ohms tapped 1500/4500 |
| Capacitors: | | |
| | 54 | 0.02 microfarads |
| | 122,130 | 0.08 microfarads |
| | 142 | 0.10 microfarads |
| | 64,124,132,135,137 | 0.20 microfarads |
| | 118,162,188 | 0.205 microfarads |
| | 74 | 0.21 microfarads |
| | 70,80 | 5 microfarads |
| | 140 | 50 microfarads |
| Inductors: | | |
| | 60 | 175 millihenrys |
| | 62,72,164 | 127 millihenrys |
| | 120,128 | 88 millihenrys |
| Tubes: | | |
| | 66,76 | 6J5 |
| | 136 | 7360 |

NOTE: All inductors have a Q of 30–40 and, of course, transistors may be used instead of vacuum tubes.

It should be pointed out that the output No. 1 may be used as an input. Accordingly, 12 and ground will be the output. The tubes would not be used. Also the circuits to the right of the triodes would not be necessary. The signal may therefore pass both ways through the filter.

The phase shift network is only necessary when the waveform of FIG. 4 is to be generated to drive one of the rectifiers. If the circuit up to output No. 1 only is used the movable taps 52 and 58 may be connected together and used in place of input 12. Resistors 50, 56 and capacitor 54 and inductor 60 may now be removed. However, the rise time and decay time for a given amount of selectivity will be less if the phase shift circuit is used.

The low pass filters 34 and 34A that are connected to the rectifiers 20 and 22 may be replaced with any filter that will substantially remove the audio components and allow the pulse shown in FIG. 5 to pass. This may be a band pass filter of the proper design.

There are many means to develop the waveforms shown in FIG. 3 and FIG. 4 other than the ones shown. When one of the other means is used, the waveforms shown in FIG. 3 and FIG. 4 will be connected to rectifiers 20 and 22 and the circuit will operate as described.

The waveforms shown in FIG. 2, FIG. 3 and FIG. 4 all start at the same instant. The peak of the waveform shown in FIG. 5 is referred to as occurring at the time of maximum response to each input pulse, and this time of maximum response occurs during the valley of the waveform shown in FIG. 4. The valley in the waveform of FIG. 4 may be considered to correspond generally to a steady state condition of the frequency selective networks such as 16 and 18 wherein the outputs from the networks 16 and 18 are substantially in opposing relation with respect to the production of current flow in the energy absorbing means (which includes resistor 75 in FIG. 7).

When two filters are used, one connected to each rectifier, 20 and 22, the outputs of the filters are connected to develop the waveform shown in FIG. 5 from the pulses developed by the rectification from the waveforms shown in FIG. 3 and FIG. 4. In such a case the rectifier outputs are not connected in opposition but the filter outputs are. The outputs of the filters 34 and 34A may be employed to control the deflection plate voltages of the tube 136. These outputs would not be interconnected in such a case. In other words each filter output would control an AC source and the controlled sources would be connected in opposition.

Although I have described my invention by reference to a particular illustrative embodiment thereof, many changes and modifications of my invention other than those specified above may become apparent to those skilled in the art without departing from the spirit and scope thereof. I therefore intend to include within the patent warranted hereon all such changes and modifications as may reasonably and properly be included within the scope of my contribution to the art.

I claim as my invention:

1. In an electric wave filter including input and output terminals, and a plurality of frequency selective networks interposed between said input and output terminals and resonant at respective frequencies lying on either side of a predetermined input frequency such that a substantial output signal will appear at the output terminals at the predetermined input frequency while frequencies relatively remote from said predetermined input frequency will be substantially attenuated, the improvement comprising:

a. a coupling circuit for providing outputs from the networks when the input terminals are excited at the predetermined input frequency and the frequency selective networks are in a steady state condition, and b. said coupling circuit including energy absorbing means coupled between said networks so as to absorb energy from the networks during the rise times and decay times of successive input pulses of alternating current energy of said predetermined input frequency applied to said input terminals, and said outputs from the networks having a phase relationship so as to be substantially in opposing relation with respect to the production of current flow in said energy absorbing means and so as to produce in said energy absorbing means essentially zero current flow after the input terminals have been excited by the predetermined input frequency and the frequency selective networks are in a steady state condition; and c. said energy absorbing means being of sufficient value to damp oscillation in the respective networks to substantially zero amplitude, when the input frequency is removed, within a time interval not substantially greater than a minimum repetition interval between input pulses.

2. The improvement set forth in claim 1, wherein said coupling circuit comprises a phase shifter connected between the input terminals and the frequency selective networks to provide the latter with signals of different phase such that the outputs from the networks have said phase relationship so as to be substantially in opposing relation with respect to the production of current flow in said energy absorbing means, in the steady state condition of the networks at the input frequency.

3. The improvement set forth in claim 1, wherein said energy absorbing means comprises a variable resistor including a pair of terminals connected to respective ones of said frequency selective networks and a movable tap connected to one of the output terminals.

4. A selective wave filter comprising:

a. a pair of input terminals for receiving an input electrical wave having a predetermined frequency and a pulse envelope;

b. a phase shift circuit connected to said input terminals for providing a pair of signals of different phase;

c. first and second frequency selective circuits connected to said phase shift circuit to receive respective ones of said different phase signals, said frequency selective circuits being tuned respectively slightly above and below said predetermined frequency so as to have overlapping frequency characteristics and connected together to algebraically add the signals therefrom to provide one output signal;

d. a pair of output terminals coupled to said frequency selective circuits to provide a second output signal which reaches a peak amplitude at a time of maximum response of the frequency selective circuits to said input electrical wave;

e. energy absorbing means intercoupling said frequency selective circuits for absorbing energy as a function of the one output signal and operable to absorb energy upon removal of the different phase signals at said frequency selective circuits to improve the decay time of said second output signal without substantial detriment to the selectivity of said circuits, and f. the phase shift circuit having a phase shift characteristic such that at the time of maximum response to the input electrical wave when the second output signal has reached a peak amplitude, the frequency selective circuits are in a generally opposing relation with respect to the production of current flow in said energy absorbing means.

5. A selective wave filter according to claim 4, wherein each of said frequency selective circuits comprises a resonant circuit tuned to a frequency adjacent said predetermined frequency and an amplifier for amplifying the signal across said resonant circuit.

6. A selective wave filter according to claim 4, comprising:

a. a pair of rectifiers each connected to both of said frequency selective circuits to rectify the respective output signals, said rectifiers being interconnected with their rectified signals in opposition to provide a resultant signal;

b. filter means connecting with the outputs of said rectifiers to recover the envelope of the resultant signal as a more accurate representation of the envelope of the input electrical wave; and c. an output circuit connected to said filter means and responsive to the recovered envelope to generate a corresponding output signal.

7. A selective wave filter according to claim 6, comprising an output signal source connected to said output circuit, said output circuit including means responsive to said recovered envelope to key the signal from said source as said corresponding output signal.

8. A selective wave filter according to claim 7, comprising an audio oscillator connected to said output circuit as said output signal source.

9. A selective wave filter according to claim 7, comprising a connection between said output circuit and said frequency selective circuits which serve as said output signal source.

10. A selective wave filter according to claim 9, comprising a circuit tuned to resonate at said predetermined frequency interposed in said connection.

11. An electric wave filter comprising:

alternating current input terminals for receiving a first signal having an envelope which rises from zero, reaches a peak and decays to zero, and a second signal having an envelope which rises from zero to a peak, decays to at least near zero, rises again to a peak and falls again in the same time interval required for the described action of said first signal;

a pair of rectifiers driven by the respective first and second signals, with outputs of said rectifiers connected in opposition;

a filter connected in circuit with the outputs of said rectifiers to produce a resultant signal; and means for producing an audible signal in response to said resultant signal.

12. An electric wave filter comprising:

alternating current input terminals for receiving a first signal having an envelope which rises from zero, reaches a peak and decays to zero and a second signal having an envelope which rises from zero to a peak, decays to at least near zero, rises again to a peak and falls again in the same time interval required for the described action of said first signal;

a pair of rectifiers driven by the respective first and second signals;

a pair of filters connected in the circuit with said rectifiers and the signals from said filters being connected in opposition to produce a resultant signal; and means for producing an audible signal in response to said resultant signal.

13. An electric wave filter comprising:

alternating current input terminals for receiving a first signal having an envelope which rises from zero, reaches a peak and decays to zero and a second signal having an envelope which rises from zero to a peak, decays to at least near zero, rises again to a peak and falls again in the same time interval required for the described action of said first signal;

a pair of rectifiers driven by the respective first and second signals;

a pair of filters connected in circuit with respective ones of said rectifiers each producing a signal in response to signals received via said rectifiers; and a pair of controlled alternating current sources each connected to one of said filters and having outputs connected in opposition to provide a resultant signal.

14. In an electric wave filter, frequency selective circuit means including an input, first and second outputs, and frequency selective networks interposed between said input and said first and second outputs and resonant at respective frequencies lying on either side of a predetermined input frequency such that a substantial output signal is produced at said predetermined input frequency while frequencies relatively remote from said predetermined input frequency will be substantially attenuated, the improvement comprising:

a. said input being operable to receive successive pulses of alternating current energy of said predetermined input frequency with each pulse having an envelope with relatively steep decay at the trailing edge thereof, b. said frequency selective circuit means including coupling means connecting said frequency selective networks between said input and said first and second outputs and being operable in response to each of said pulses of said alternating current energy of said predetermined input frequency to produce at the first output a first alternating current signal with an envelope which rises from about zero, reaches a peak and decays to about zero, and to produce at the second output a second alternating current signal having an envelope which rises from about zero to a peak, decays from such peak and rises again to a peak and falls again in the same time interval required for the described action of said first alternating current signal, and c. a rectification and filter circuit connected with said frequency selective circuit means for producing an output signal in response to each of said successive pulses of alternating current energy of said predetermined input frequency and including first and second rectifier means having rectifier inputs connected respectively to said first and second outputs for receiving the respective first and second alternating current signals and having rectifier outputs for supplying rectified first and second alternating current signals, and including circuit means connected with the rectifier outputs of said first and second rectifier means for supplying an output waveform corresponding to a combination in opposing relation of the rectified first and second alternating current signals.

15. An electric wave filter comprising:

a. input means for receiving successive pulses of alternating current energy of predetermined input frequency, b. frequency selective circuit means including frequency selective networks connected with said input means, and having first and second outputs, and said frequency selective circuit means including coupling means connecting said frequency selective networks with said first and second outputs, and being operable in response to each of said pulses of said alternating current energy of said predetermined input frequency to provide at said first output a first alternating current signal having an envelope which rises from zero, reaches a peak and decays to zero, and to provide at said second output a second alternating current signal having an envelope which rises from zero to a peak, decays to at least near zero, rises again to a peak and falls again in substantially the same time interval required for the described action of said first alternating current signal, and c. a rectification and filter circuit including first and second rectifying means having rectifier inputs connected respectively to said first and second outputs for receiving the respective first and second alternating current signals and having rectifier outputs for supplying rectified first and second alternating current signals, and including circuit means connected with the rectifier outputs of said first and second rectifier means and operable for producing an output waveform corresponding to a combination in opposing relation of the rectified first and second alternating current signals.

16. In an electric wave filter including input and output terminals; a plurality of frequency selective networks interposed between said input and output terminals and resonant at respective frequencies lying on either side of a predetermined input frequency such that a substantial output signal will appear at the output terminals at the predetermined input frequency while frequencies relatively remote from said predetermined input frequency will be substantially attenuated; a coupling circuit responsive to successive input pulses of alternating current energy of the predetermined input frequency applied to said input terminals, and coupling said input terminals with said frequency selective networks for providing outputs from the networks of predetermined phase relationship when the input terminals are excited at the predetermined input frequency and the frequency selective networks are in a steady state condition, said coupling circuit including energy absorbing means coupled between said networks, and the outputs from said networks after the input terminals have been excited by the predetermined input frequency and the frequency selective circuits are in a steady state condition being in generally opposing relation with respect to the production of current flow in said energy absorbing means by virtue of said predetermined phase relation, and producing a potential across said energy absorbing means which rises from zero to a peak, decays from such peak in the steady state condition, and rises again and falls again in response to each of the input pulses, for reduced energy absorption of energy of the predetermined input frequency in such steady state condition; and said energy absorbing means being of sufficient value to effectively damp oscillation in the respective networks when the input frequency is removed at the trailing edge of each of the input pulses, within a time interval not substantially greater than a minimum time interval between the input pulses without producing a substantial reduction in the selectivity of the frequency selective networks.

17. The filter as set forth in claim 16, wherein said coupling circuit comprises phase shifter means connected with the frequency selective networks and having a phase shift characteristic such as to produce said predetermined phase relationship between the outputs from said networks in the steady state condition thereof.

18. The method of receiving signals which comprises:

a. receiving successive input pulses of alternating current energy of a predetermined input frequency, b. transmitting the received pulses to a frequency selective circuit having two resonant frequency networks such as to transmit a band of frequencies including said input frequency and to reject frequencies outside of said band of frequencies, c. coupling each of the successive pulses via the frequency selective circuit with an output so as to produce at the output an alternating current signal having a signal envelope which rises from zero, reaches a peak and decays to zero, in response to each of said successive pulses, d. coupling the frequency selective circuit with energy absorbing means and producing at the energy absorbing means respective alternating current potentials in the steady state condition of said resonant frequency networks at said input frequency, said alternating current potentials being generally opposed with respect to the production of current flow through said energy absorbing means but producing substantial current flow in said energy absorbing means during decay of each of the successive pulses of alternating current energy, and producing a potential across said energy absorbing means which rises from zero to a peak, decays from such peak in the steady state condition, and rises again and falls again in response to each of the input pulses, and e. substantially diminishing the ringing of the frequency selective circuit during the decay intervals of the successive input pulses without a corresponding decrease in its selectivity by the coupling of the frequency selective circuit with said energy absorbing means.

* * * * *